United States Patent
Tso

Patent Number: 6,085,201
Date of Patent: *Jul. 4, 2000

[54] CONTEXT-SENSITIVE TEMPLATE ENGINE

[75] Inventor: Michael Man-Hak Tso, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/672,855

[22] Filed: Jun. 28, 1996

[51] Int. Cl.[7] .................................................. G06F 17/27
[52] U.S. Cl. ............................................................ 707/505
[58] Field of Search ................................. 707/505–508, 707/531–533, 908, 501, 513; 395/604, 20, 77

[56] References Cited

U.S. PATENT DOCUMENTS

| | | | |
|---|---|---|---|
| 4,879,648 | 11/1989 | Cochran et al. | 707/507 |
| 5,297,027 | 3/1994 | Morimoto et al. | 707/501 |
| 5,557,723 | 9/1996 | Holt et al. | 707/506 |
| 5,579,467 | 11/1996 | Capps | 707/507 |
| 5,799,268 | 8/1998 | Boguraev | 704/9 |
| 5,905,863 | 5/1999 | Knowles et al. | 395/200.36 |

*Primary Examiner*—Mark R. Powell
*Assistant Examiner*—Motilewa Good-Johnson
*Attorney, Agent, or Firm*—Kenyon & Kenyon

[57] ABSTRACT

A template engine generates a context-sensitive text message corresponding to an input text string. The input text string is first decomposed into a set of search words. The template engine then uses those search words to search a database of predefined templates to identify a template that is contextually appropriate for the input text string. The identified template may then be used to generate a responsive text message. The template engine is also able to "learn," dynamically updating the template database to reflect user preferences with respect to templates identified by the template engine as being contextually appropriate for particular search words.

18 Claims, 4 Drawing Sheets

Figure 4

CONTEXT-SENSITIVE TEMPLATE ENGINE

BACKGROUND OF THE INVENTION

The present invention relates generally to the field of text processing, and in particular to a context-sensitive template engine for analyzing the content of a text segment and automatically generating a template for responsive text. The invention is particularly well-suited for electronic messaging applications in which users are limited to a device having little or no keyboard functionality.

In the field of electronic messaging, or "e-mail," it is desirable to minimize the time and effort required for a user to compose text messages. Accordingly, there has been an effort to develop so-called "assisted mail" systems capable of generating some or all of a response to a received text message. Such systems have developed along two lines: built-in response generators and rule-based response generators.

An example of a built-in response generator is the TeleScript system developed by General Magic. Assuming that both a message sender and a message recipient are TeleScript users, the sender may include certain reply options in an outgoing text message. Upon receipt of such a message, the recipient may select a desired reply and TeleScript will automatically generate a responsive text message. For example, an outgoing message might be "Would you like to go to lunch now?" followed by a "Yes/No" selection option. The recipient may then reply to the message simply by selecting, or "clicking on," the appropriate response.

An example of a rule-based response generator is the cc:Mail® product marketed by Lotus Corp. In this system, a user can establish rules for automatically replying to incoming text messages. When an incoming message matches a predefined rule (e.g., the message is from a certain person, the message includes a certain word or combination of words), the system automatically responds to the message with a predefined, fixed text message.

A number of problems exist with both the built-in and rule-based response generators currently available. For example, an undesirable feature of built-in systems like TeleScript is the requirement that both the sender and the recipient be users of the same or compatible e-mail systems capable of recognizing the encoded reply options. Unfortunately, most popular e-mail systems today do not recognize the necessary codes. These presently-known assisted mail systems are likewise relatively inflexible, requiring adherence to certain stylistic restrictions dictated by predefined reply option formats, automatic matching rules and the use of predetermined message texts for automatically-generated responses. Finally, the existing systems are often difficult to use in view of special programming and configuration requirements for initial setup. In cc:Mail, for example, a user must first engage in the cumbersome task of establish matching rules using Boolean logic operators. Once established, these rules are rigid in that there is no subsequent interaction permitted to tailor the rules in view of actual usage patterns.

The present invention is intended to address these and other shortcomings of known assisted mail systems by providing a context-sensitive template engine to automatically generate a text message, whether in response to a previously-received message or "from scratch," whose meaning corresponds to certain user-selected words or phrases. The features and benefits of the invention are discussed in detail below.

SUMMARY OF THE INVENTION

The present invention provides a context-sensitive template engine that enables users to generate a text string that is responsive to the content of an input text string. The present invention is especially well-suited to electronic messaging applications in which users have limited keyboard functionality available, enabling such users to compose and/or reply to messages much more efficiently than is possible with existing applications.

In a preferred embodiment, the template engine receives an input text string from a user interface portion of an e-mail application. The template engine then decomposes, using a parser, that input text string into a set of search words or input keywords. These keywords are then used to search a template database for one or more templates that most closely correspond to the context of the input text string. The template database includes a plurality of templates, each of which is associated with one or more weighted keywords. As the search of the template database progresses, the template engine attempts to find the template having the highest total weight value based upon matches between the template keywords and the keywords extracted from the input text string.

Templates stored in the template database are configured to provide maximum flexibility and utility to users. Such templates will typically include one or more phrases and a number of choices, enabling the user to build a sentence that best conveys the user's intended meaning. These choices may consist of single words, phrases, or input form identifiers. Input form identifiers permit users to access input forms for dynamically entering such information as dates and times. Using these templates, users can efficiently generate an appropriate text string with minimal effort.

An especially advantageous feature of the template engine according to the present invention is its ability to "learn" from continued use. When a user elects to use a suggested template (i.e., one identified through the keyword search), the template engine will increase the weight values associated with the matched keywords to increase the likelihood that the same template will be suggested in the future upon presentation of similar keywords extracted from an input text string. By contrast, such weight values will be decreased in the event a user elects not to use a suggested template. In this way, the template engine can dynamically adapt itself to a particular user's preferences, thereby increasing its utility.

BRIEF DESCRIPTION OF THE DRAWINGS

FIG. 4 illustrates an input form of a type which may be included in a message template.

DETAILED DESCRIPTION

The present invention provides a context-sensitive template engine that helps users compose and/or reply to e-mail messages using minimal keyboard access. Given an input text passage, such as a portion of a partially-composed outgoing text message or a portion of a received text message, the template engine can suggest one or more predefined, context-appropriate sentences to include in the outgoing text message based on the actual content of the input text passage. The present invention thus reduces the inconvenience imposed by devices having limited or no keyboard access, such as a Smartphone or similar hand-held device.

Before explaining in detail the various features and advantages of the present invention, it will be helpful to define a number of terms used herein. First, a "template" is a text string consisting of one or more "phrases." A phrase, in turn, is a text string which may include a set of optional substrings, called "choices." A choice may be a pure text string, an "input form identifier," or a text string including an input form identifier. An input form identifier is a graphical user interface that enables a user to easily enter special data (e.g., times, dates, numbers) using, for example, a spin button or a scroll bar. Data entered using an input form identifier may then be converted to text and inserted into a text string. Finally, each template is associated with a set of "keywords," where each keyword has a predetermined "weight." The higher the weight assigned a given keyword, the more influential that keyword will be in the template selection process.

In an embodiment of the present invention, the template engine is implemented as an application program interface (API) exported by a dynamic link library (DLL). This type of software implementation is well known in the art of data processing, and thus is not described in detail herein. In any event, the present invention does not rely on any particular means by which the template engine is made available to a user or an application programmer.

Figure 1:
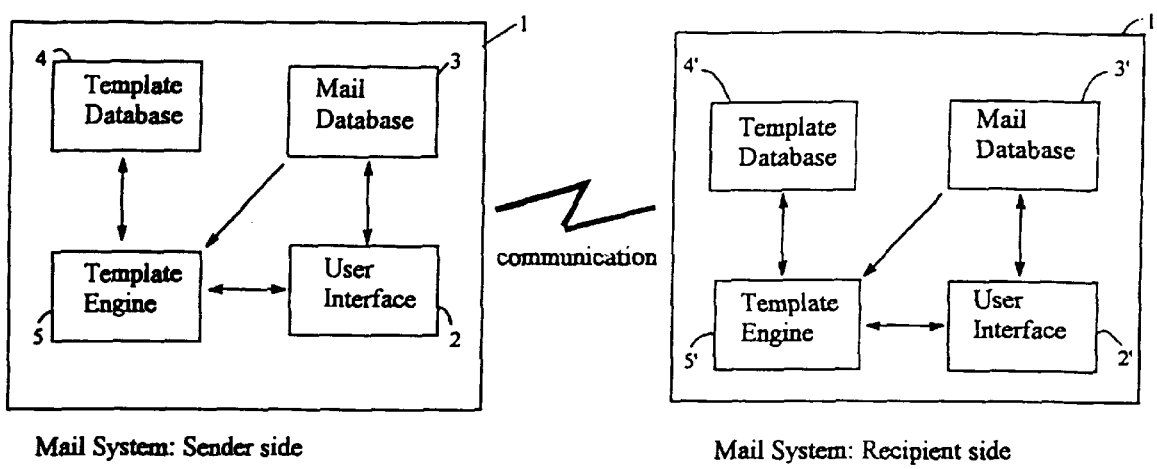
FIG. 1 is a block diagram showing the system architecture for an embodiment of a context-sensitive template engine according to the present invention.

Referring now to the block diagram of FIG. 1, a typical e-mail system 1 of the type to which the present invention is directed includes a user interface 2 and a mail database 3. The user interface 2 provides the standard user functions necessary to send and/or receive e-mail messages, and includes a video display, a user input device (e.g., an alphanumeric keypad), and software drivers which enable a user to interact with the e-mail system 1. The mail database 3 stores e-mail messages in digital form, and may consist of a multi-tiered directory of ASCII-format data files. It should be noted that the block diagram of FIG. 1 is intended to convey the logical structure of the e-mail system 1, as the present invention does not depend on any particular physical configuration. For example, some or all of the various components of the e-mail system 1 may be distributed over a local area network (LAN).

According to the embodiment shown in FIG. 1, the e-mail system 1 includes a template database 4 electronically coupled to a template engine 5. The template engine 5 is electronically coupled to the user interface 2, and is capable of retrieving data from the mail database 3. Like the mail database 3, the template database 4 may be implemented as a multi-tiered directory of ASCII-format data files. The template database 4 may be viewed as a sub-module of the template engine 5, or as a separate data structure with which the template engine 5 interacts. Both the template engine 5 and the template database 4 are described in further detail below.

Significantly, the template engine 5 as shown in FIG. 1 employs standard data interface techniques and protocols to interact with the user interface 2 and the mail database 3. In other words, the template engine of the present invention is advantageously independent of any particular e-mail system or communications device, thereby providing maximum flexibility to users. The template engine may thus reside in a "sender side" e-mail system 1, a "recipient side" e-mail system 1', or both. The fact that an e-mail message was generated using the template engine will be completely transparent to a recipient of that message.

It should be noted that the user interface 2 is not itself part of the present invention; that is, the template engine 5 provides functionality for retrieving data from and maintaining the template database 4, but it does not provide user interface functions. In order for a user to compose and/or reply to an e-mail message with the aid of the template engine 5 according to the present invention, the user's e-mail application must provide a user interface 2 capable of (i) displaying templates, phrases and choices; (ii) displaying a special input form corresponding to an input form identifier; and (iii) converting a user's selection from a special input form into text. The separation of the user interface functions from the template engine 5 provides a significant advantage over existing assisted mail systems, giving system users and application programmers added flexibility in customizing the application according to a particular user's needs.

Figure 2:
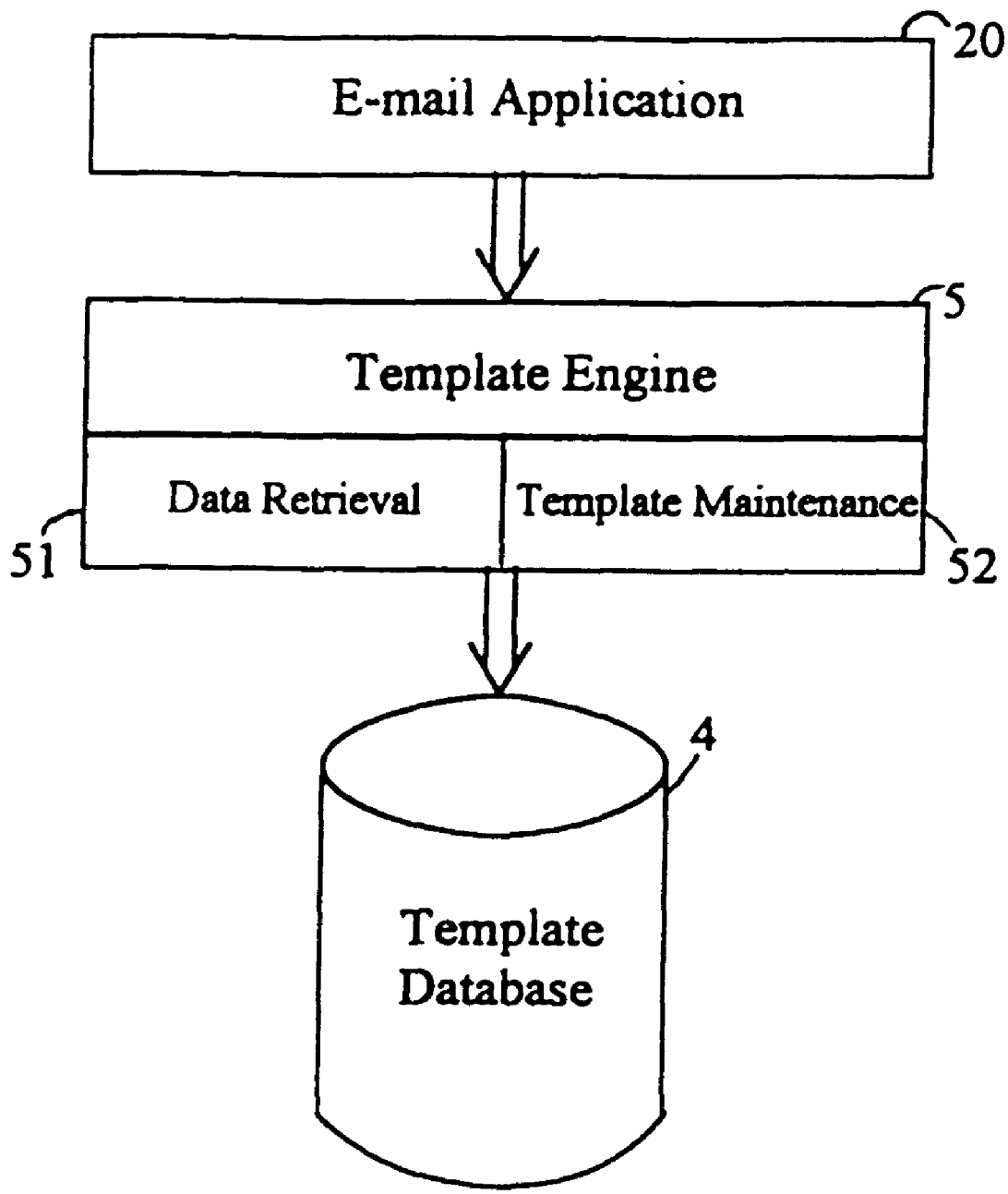
FIG. 2 is a block diagram showing the logical relationship between an e-mail application and a template engine according to the present invention.

The block diagram of FIG. 2 graphically illustrates the manner in which an e-mail application 20 interacts with a template engine 5 according to the present invention. The e-mail application 20 is electronically coupled to the template engine 5, shown here as an API. In other words, the e-mail application 20 is capable of invoking the template engine 5. The template engine 5 is in turn capable of storing data in, and retrieving data from, the template database 4.

Figure 3:
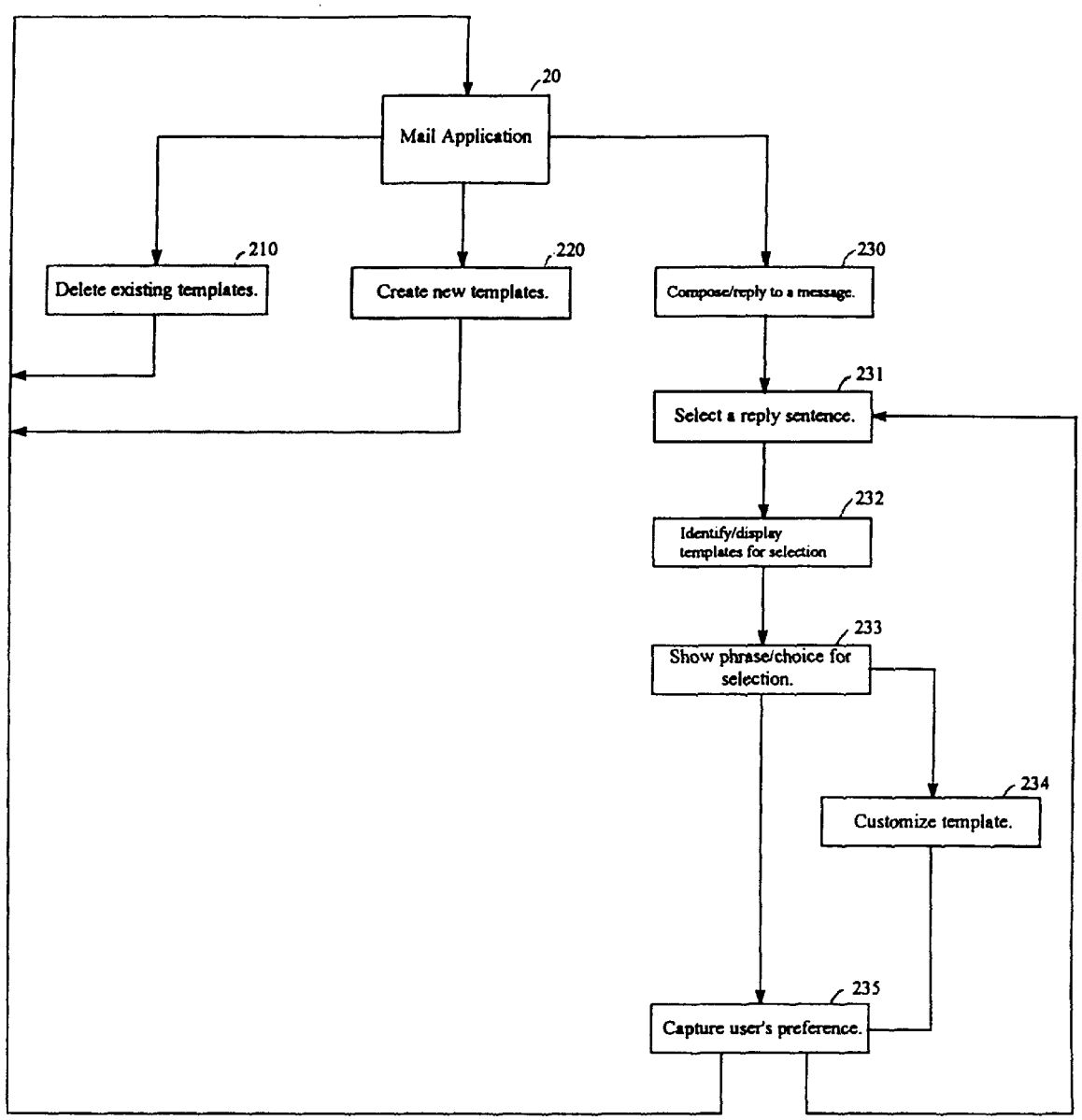
FIG. 3 is a flow chart showing the logic flow in an embodiment of the present invention.

As shown in FIG. 2, the functions of the template engine 5 may be broadly classified as data retrieval functions 51 and template maintenance functions 52. Looking more closely at these functions, the flow chart of FIG. 3 illustrates the call sequence of a template engine according to this embodiment.

When a user wishes to compose a new e-mail message or generate a reply to a received e-mail message, the user selects a text string to be processed, for example, by clicking-on it. The particular method by which such a selection is made will vary according to the user input device available to the user. For example, where the user has access to a laptop or other personal computer, the selection could be accomplished using a mouse. On the other hand, with a device having limited user interface capabilities, such as a Smartphone, the selection could be accomplished by appropriately positioning a cursor using a touch keypad and pressing an "ENTER" key. In either case, once the user makes a selection the user interface 2 of the e-mail application 20 will invoke the template engine 5 (step 230), passing the entire text message being edited by the user and the current cursor position to the template engine 5.

Upon being invoked, the template engine 5 analyzes the information passed by the e-mail application 20 to determine the portion of the text message for which a template is to be provided (step 231). According to one embodiment, the template engine 5 initially views the entire text message passed by the e-mail application 20 as a single data string. Then, using standard string processing techniques, the template engine 5 starts at the current cursor position and searches backwards in the text string until it finds a sentence-ending punctuation mark (i.e., period, question mark, exclamation point). The template engine 5 then designates the first word immediately following the punctuation mark as the beginning of the text string to be processed.

A similar technique may then be used by the template engine 5 to determine the end of the text string to be processed. That is, the template engine 5 starts at the current cursor position and searches forward until a sentence-ending punctuation mark is located, which will then be designated the end of the data string to be processed. The data string is thus defined by these beginning and ending positions.

Once the text string to be processed is identified, the template engine 5 decomposes the text string into search words that will be used to search for a template (step 232). The template engine 5 may, for example, build an array in which each member contains a different word extracted from the text string.

The template engine 5 then uses the extracted words to search the set of predefined templates stored in the template database 4 (step 232). For each stored template, the template engine 5 compares the weighted keywords associated with that template to the array of extracted search words. If a keyword is found in the array, the weight value associated with that keyword is added to a running total weight value for that template. In this fashion, the template engine 5 determines a total weight value for each template in the template database 5. The template with the highest total weight value is then designated as the most appropriate template for the text string being processed.

Ideally, the template engine 5 employs a "blind" text string match when comparing the extracted words to the stored keywords. The template engine 5 is therefore completely language independent, again providing maximum flexibility to system users and application programmers.

To illustrate the calculation of these total weight values, assume the template database 4 contains a template having the following keywords defined:

| keyword | weight |
| --- | --- |
| where | 50 |
| when | 50 |
| meet | 45 |
| place | 25 |
| time | 25 |

Further assume that the text string being processed is the following:

When and where would you like to meet?

Given this text string, the above-defined template would have a total weight value of "145" because the keywords "where," "when" and "meet" were found in the text string.

Once the template engine 5 determines the most appropriate template, it passes that template to the user interface 2 for presentation to the user (step 233). This may be accomplished by passing a data string containing the template to the user interface 2 or, alternatively, by passing a pointer to a temporary memory location where the template is stored.

It is conceivable that more than one template will have a highest total weight value, in which case the user interface 2 could present multiple templates to the user. The user could then select which template is most appropriate for that user's purposes. It is also conceivable that the template or templates which the template engine 5 determines to be most appropriate may not meet the user's particular needs. In such a case, the user could request that the template engine 5 present additional templates from which the user may choose. These additional templates would typically be presented to the user in an order based on their respective total weight values.

According to this embodiment, templates presented to a user may include a number of choices that permit the user to minimize the amount of typing required, and may also include one or more input form identifiers. For example, a user may be presented with the following template:

Let's meet at [the time you suggested|Monday|<time>] at [the place you suggested|my office|the cafeteria].

The first phrase in this template, Let's meet at [the time you suggested|Monday|<time>], consists of a set of three choices: the time you suggested, Monday, and <time>. The third choice is an input form identifier corresponding to a special input form for entering a time.

Figure 4:
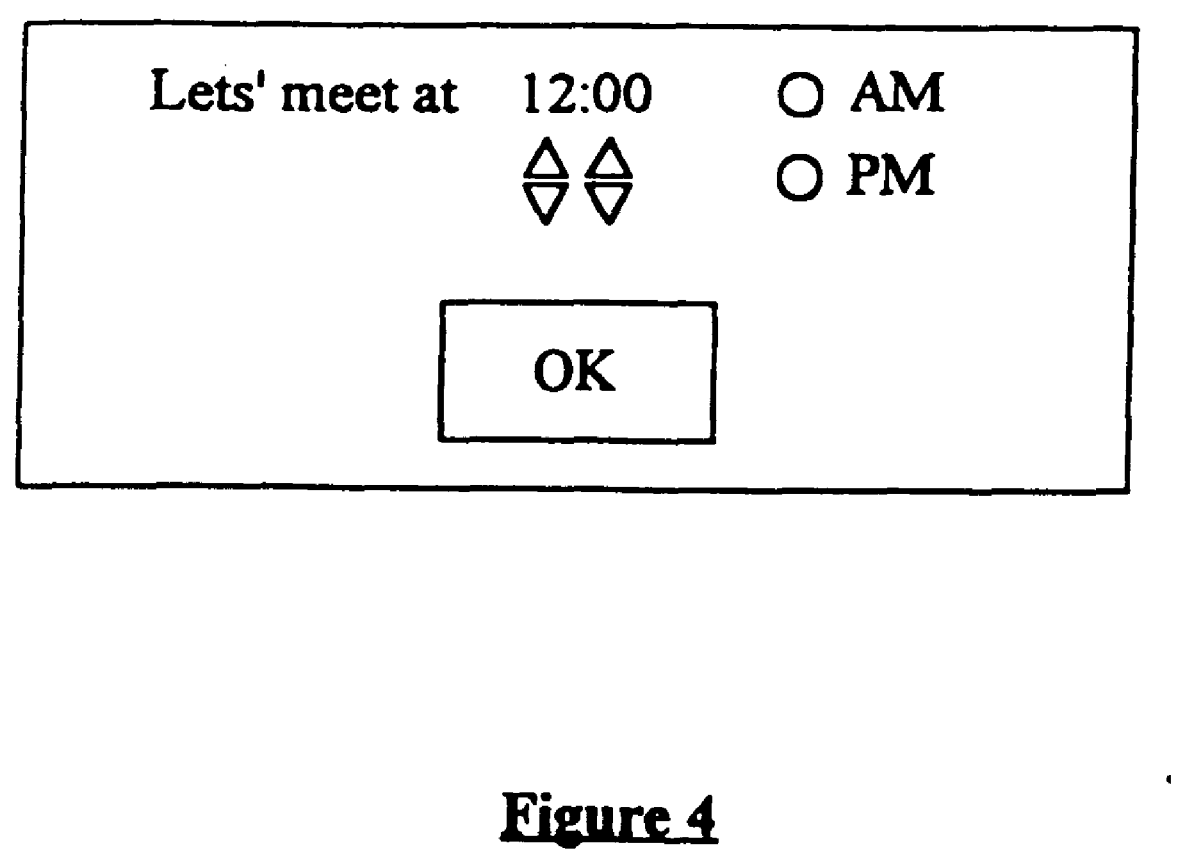

FIG. 4 illustrates a special input form of a type that could be used to specify a time for inclusion in the exemplary template above. As shown, the user can enter a time by clicking spin buttons (i.e., the up/down arrows) and option buttons (i.e., filled/open circles). The processing associated with the special input form is the responsibility of the user interface 2, and is initiated by a user clicking on an input form identifier presented in the template. Special input forms such as those described herein, including the processing required to support them, are well known in the art.

In view of the choices included in the exemplary template, including the input form identifier, it is apparent that the template could be used to generate many different text strings. For example, the user could use the template to generate the response:

Let's meet at the time you suggested at the place you suggested.

or

Let's meet at 12:30 AM at the cafeteria.

The template engine 5 of the present invention thus enables a user to compose text messages using dramatically fewer keystrokes than would otherwise be required. To illustrate, the first of the foregoing sample responses would require more than sixty (60) keystrokes to input manually, whereas the template engine 5 can be used to generate the same sentence with less than five (5) keystrokes. The benefits of this are substantial, especially where the user is operating a device with restricted input capabilities.

An especially advantageous feature of the template engine according to the present invention is its ability to "learn" from user activity. The template engine 5 will dynamically increase or decrease the weight values associated with the keywords of a template suggested to a user depending upon whether the user accepts or rejects the suggestion. With reference to the template discussed above, for example, the template engine 5 might increase the weight values associated with the matched keywords "where," "when" and "meet" by "5" if the user accepts the suggestion or decrease those weight values by "5" if the user rejects the suggestion (FIG. 3, step 235). This dynamic adjustment of weight values is preferably limited by predefined minimum (e.g., "0") and maximum (e.g., "100") weight values. The template engine 5 is therefore able to capture the user's preferences and use them in future template suggestion procedures, thus tailoring the template engine 5 to the particular user's needs and preferences.

Yet another useful feature of the template engine 5, as shown in this embodiment of FIG. 3, is the ability for a user to customize templates stored in the template database 4 (step 234). As shown above, the template engine 5 might suggest the following template to a user:

Let's meet at [the time you suggested|Monday|<time>] at [the place you suggested|my office|the cafeteria].

The user could invoke the customization function to replace the choice "the cafeteria" with "the thirdfloor conference room," and the template engine 5 would update the template database 4 accordingly. Future uses of that template would then include the revised choice. Here again, the template engine is capable of being adapted to the needs and preferences of the particular user, thus increasing its usefulness.

Upon completion of template processing for a particular section of text selected by the user, the additional text generated by the template engine 5 is passed to the e-mail application for insertion in the message being composed. The user interface 2 could be programmed to automatically insert the generated text at the end of the message text, or alternatively could prompt the user to place the cursor at a particular location where the text is to be inserted. As illustrated in FIG. 3, the user could then select additional text passages for which templates are desired, and processing will continue as described above. Alternatively, the template engine 5 and user interface 2 may be fully integrated into an e-mail application, providing a seamless set of text generating functions in a manner that is transparent to the end user.

In this embodiment, as shown in FIG. 3, the template engine 5 also provides template maintenance functions which allow the user to further customize the system. For example, the template engine 5 provides the user with the ability to delete existing templates from the template database 4 (step 210) or add new templates (step 220). Where a new template is being added, the user would have the ability to enter text phrases and choices, including input form identifiers for any special input form supported by the user interface 2, identify keywords to be used in searching for suggested templates, and assign weight values to those keywords.

According to this embodiment, the template engine 5 also provides memory management functions to improve the overall performance of the application. For example, upon being invoked by a user, the template engine 5 may first dynamically allocate memory to store the selected text passage being processed. The template engine 5 may also dynamically allocate sufficient memory to store any suggested templates retrieved from the template database 4. Similarly, the template engine 5 may dynamically allocate memory when the user wishes to delete or update existing templates. In each case, the template engine 5 stores the template back to the template database 4, if needed, and releases the allocated memory upon completion of processing.

Persons skilled in the art will recognize that the present invention is by no means limited to applications in which the user is faced with restricted input capabilities. The present invention could be just as beneficial to a user with a standard personal computer, since it provides the ability to generate e-mail messages with minimal typing. In any type of application (e.g., Smartphone, laptop, PC), the benefits provided by the present invention will increase with use in view of the learning and customization features described above. The user will be able to compose or respond to many routine e-mail messages using only a few key strokes, saving the time and effort that otherwise would have been required to type out the message.

Likewise, the template engine of the present invention is not limited to use only in electronic messaging applications. The present invention may be readily applied to any type of text processing application, including standard word processing applications. For example, where a user is required to repetitively generate correspondence on the same subject matter, that user would benefit from having a database of templates from which to draw. The template engine of the present invention would provide such a user with substantially greater flexibility than is provided by simply copying boilerplate.

As noted above, the template engine according to the present invention may be propagated through a dynamic link library (DLL). In such an embodiment, the DLL may be stored in a ROM (Read Only Memory) or flash memory that would be included in a communications device, such as a Smartphone. Alternatively, the template engine could be propagated on a diskette or other type of portable memory for loading into a communications device or computer.

It is contemplated that the template engine as provided to users would already have a set of predefined templates; however, the template engine would also have the ability to receive input of additional templates as they become available. Indeed, where users have access to a network, the template database could alternatively be implemented as a central shared resource so that multiple users would have access to the same templates. Customized templates could then be stored locally on the user's communications device or computer.

What is claimed is:

1. A method for generating a context-sensitive text message corresponding to an input text string, the method comprising the steps of:
   a. decomposing the input text string into a set of search words;
   b. comparing said set of search words to a set of keywords associated with each of a plurality of context-sensitive templates, wherein each of said keywords has an associated numeric weight value for each of said context-sensitive templates, said comparison comprising calculation of a total weight value for each of said plurality of context-sensitive templates;
   c. selecting one of said context-sensitive templates as corresponding contextually to the input text string; and
   d. generating a text message using said selected context-sensitive template.

2. The method of claim 1 wherein said step of identifying a context-sensitive template comprises determining which of said context-sensitive templates has a highest total weight value.

3. The method of claim 1 further comprising the step of presenting one or more of said context-sensitive templates to a user.

4. The method of claim 3 further comprising the step of increasing the numeric weight value for a keyword associated with said context-sensitive template selected by the user.

5. The method of claim 3 further comprising the step of decreasing the numeric weight value for a keyword associated with a context-sensitive template presented to the user but not selected for use in generating a text message.

6. A template engine for generating a context-sensitive text message corresponding to an input text string, the template engine comprising:
   a. an input text processor;
   b. a template database containing a plurality of context-sensitive templates, each of which has a weighted keyword associated therewith;
   c. a database access module in communication with said input text processor and said template database, said database access module being configured to search said template database for a context-sensitive template most closely corresponding contextually to an input text string; and
   d. an output text generator in communication with said database access module.

7. The template engine of claim 6 wherein said input text processor further comprises a parser decomposing the input text string into a set of search words.

8. The template engine of claim 6 further comprising a template database maintenance module.

9. A method for dynamically generating text in response to an input text string, the method comprising:
   a. decomposing the input text string into a set of search words;
   b. comparing said set of search words to a set of keywords associated with each of a plurality of context-sensitive templates to identify a responsive template most closely corresponding contextually to the input text string, wherein each of said set of keywords has an associated numeric weight value for each of said context-sensitive templates, said comparison comprising calculation of a total weight value for each of said plurality of context-sensitive templates, with said responsive template being a context-sensitive template having a highest total weight value; and
   c. generating an output text string from said responsive template.

10. The method of claim 9 further comprising the steps of presenting said responsive template to a user.

11. The method of claim 10 further comprising the step of increasing the numeric weight value for a keyword associated with said responsive template when the user determines to use said responsive template to generate an output text string.

12. The method of claim 10 further comprising the step of decreasing the numeric weight value for a keyword associated with said responsive template presented when the user determines not to use said responsive template to generate an output text string.

13. A communications device capable of dynamically generating a response to an input text message, said communications device comprising a user interface and a template engine coupled thereto, said template engine including a data store holding a plurality of context-sensitive templates, each of which has a weighted keyword associated therewith, wherein said communications device analyzes an input text string, searches said data store, calculates a total weight value for each of said plurality of context-sensitive templates using said weighted keywords, and identifies a context-sensitive template most closely corresponding contextually to the input text string using said total weight values.

14. A method for composing a text message corresponding to an input text string, the method comprising:
   a. decomposing the input text string into a set of search words;
   b. comparing the set of search words to a set of keywords associated with each of a plurality of context-sensitive templates, wherein each of the keywords has an associated numeric weight value for each of the context-sensitive templates, said comparison comprising calculation of a total weight value for each of the plurality of context-sensitive templates;
   c. identifying one of the context-sensitive templates as corresponding contextually to the input text string based on a result of said comparison; and
   d. composing a text message using the identified context-sensitive template.

15. The method of claim 14, wherein said step of identifying one of the context-sensitive templates comprises determining which of the context-sensitive templates has a highest total weight value.

16. The method of claim 14, further comprising presenting one or more identified context-sensitive templates to a user.

17. The method of claim 16, further comprising increasing the numeric weight value for a keyword associated with a context-sensitive template selected by the user.

18. The method of claim 17, further comprising decreasing the numeric weight value for a keyword associated with a context-sensitive template presented to the user but not selected.

* * * * *